United States Patent [19]
Rose

[11] 3,906,902
[45] Sept. 23, 1975

[54] HAYSTACK FEEDER APPARATUS FOR LIVESTOCK

[76] Inventor: Peggy J. Rose, 505 E. Milwaukee, Spencer, Iowa 51301

[22] Filed: Dec. 26, 1973

[21] Appl. No.: 427,677

[52] U.S. Cl. ................................. 119/60; 119/51
[51] Int. Cl.² ............................................ A01K 5/00
[58] Field of Search ............. 119/60, 16, 51, 27, 58

[56] References Cited
UNITED STATES PATENTS

| 57,115 | 8/1866 | Fowler | 119/60 |
| 2,491,577 | 12/1949 | Olinger | 119/60 X |
| 3,063,416 | 11/1962 | Elstner | 119/51 |
| 3,631,839 | 1/1972 | Postigo | 119/27 |

*Primary Examiner*—Hugh R. Chamblee
*Attorney, Agent, or Firm*—Henderson & Strom

[57] ABSTRACT

Parallel side members are slidably mounted upon parallel frame members causing a haystack to be completely enclosed. A locking member connects the side and frame members and engages portions of the frame members as the side members are moved by livestock eating the haystack through said side members. The number and arrangement of the locking member connections determines the distance the side members may slide upon the frame members.

2 Claims, 5 Drawing Figures

HAYSTACK FEEDER APPARATUS FOR LIVESTOCK

BACKGROUND OF THE INVENTION

This invention relates to livestock feeding devices and more particularly to haystack feeders or dispensers for young and adult cattle and the like.

Where haystacks are left completely accessible to cattle and no controls are placed on the animal's feeding, there is much wastage of the forage. Cattle tend to eat from the top to the bottom of the stack and to climb up into the stack. Much of the hay is trampled by the cattle, and, since cattle usually will not eat the trampled hay, there is therefore much wastage.

A number of barriers have been devised to solve the problem. These barriers have been of various shapes and have been rigid in construction. Because of the rigid connection of the panels of these devices no adjustment has been possible. Furthermore, most of the devices have been rigidly affixed to the ground. Farmers have therefore been forced to spend large amounts of time re-stacking the hay and moving it to within reach of the cattle. In addition there has been a limited choice to the farmer of where he will feed his cattle. Those devices which have been movable have been highly susceptible to freezing down or sticking in mud, manure, and waste forage.

Attempts have been made to eliminate some farmer labor time by chaining together, by means of a chain or rope, rigid barriers mounted on skids. Although labor time involved in re-stacking hay is sometimes saved since the cattle may push the skidded barrier in toward the haystack as they eat, these devices have no effective means of directional control and closer to the stack. In addition, the skids are subject to the freezing down or sticking mentioned before. Finally, cattle quite often are able to negotiate the chain or rope between the barriers and approach the haystack unimpeded thereby rendering the device totally ineffectual.

Technological advancements in field stacking machines have led to an increasing prevalence of "bread-loaf" type haystacks in Midwestern cattle feeding. Present devices are not readily adaptable for efficient use with this new technology.

SUMMARY OF THE INVENTION

According to this invention a haystack feeder apparatus is provided which is suitable for use in controlling the feeding of livestock.

The apparatus includes end or frame panels having skids which engage the ground. The frame panels are arranged side by side in parallel relationship, and side panels are placed across the frame panels. The side panels are slidable along the frame panels. Both frame and side panels are divided by a member into upper and lower feeding sections, the upper sections being crossed by diagonal bars and the lower sections by vertical bars.

Locking arms are suspended from each end of the side panels and are affixed at several places along their length to the side panels by means of pins. When cattle feed they push against the diagonal and vertical bars of the feeding sections thereby causing the side panels to slide along the frame members. The side members slide freely until a pin engages one of the bars. The length of free travel therefore is regulated by the arrangement of pins used for actively fastening the locking arms to the side panels.

It is an object of this invention to provide a novel haystack feeding apparatus.

It is another object of this invention to provide a lightweight haystack feeder apparatus that can easily be assembled, disassembled, transported and reassembled.

A further object of this invention is to provide an apparatus which prevents wastage of forage and eliminates farmer labor of continually re-stacking hay, by controlling the distance cattle may move into a haystack while eating, and their direction of approach.

Another object of this invention is to provide an apparatus having all sliding parts suspended above the ground so as to eliminate freezing problems.

The provision of a haystack feeder apparatus suitable for use with bread-loaf type haystacks produced by modern haystacking machines is another object of this invention.

Still another object of this invention is the provision of a haystack feeder apparatus capable of attaining these objects and which is economical, rugged and effective.

These objects and other features and advantages of the invention will become readily apparent by reference to the following description when taken in conjunction with the accompanying drawings.

BRIEF DESCRIPTION OF THE DRAWINGS

The appended drawings illustrate the invention, wherein.

DESCRIPTION OF THE PREFERRED EMBODIMENT

Figure 1:
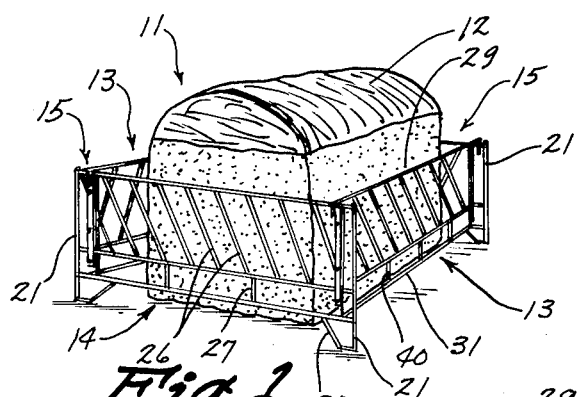
FIG. 1 is a perspective view of the invention enclosing a bread-loaf type of haystack.

Referring now to the drawings, the preferred embodiment of the invention is indicated generally at 11 in FIG. 1 enclosing a bread-loaf type haystack 12. The invention 11 is generally comprised of side panel members 13, frame panel members 14, and locking members 15.

Figure 4:
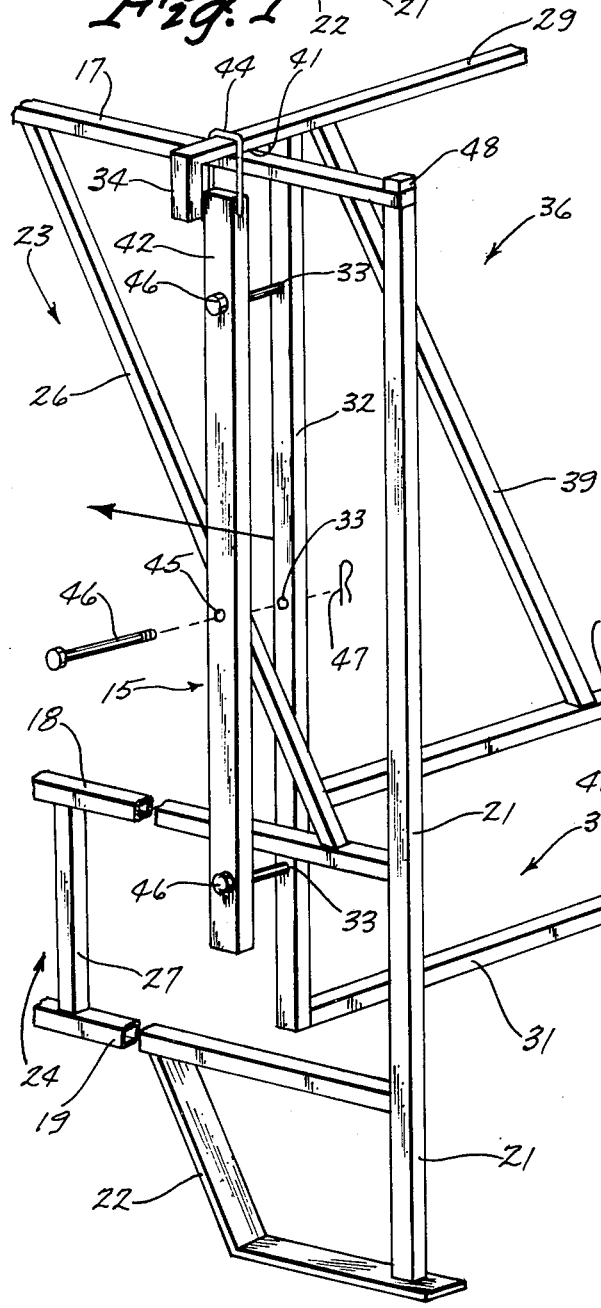
FIG. 4 is an enlarged, fragmentary, perspective view of the invention.

Referring to FIGS. 1 and 4, the frame panel members 14 are each comprised of upper 17, middle 18, and lower 19 horizontal members. The horizontal members 17, 18 and 19 are affixed between vertical end members 21 which extend below horizontal member 19 and engage the ground. Skids 22 are affixed between lower horizontal member 19 and each of the end members 21 and also engage the ground. The middle member 18 divides the frame panel member 14 into upper and lower feeding sections indicated generally at 23 and 24 respectively. Uniformly spaced diagonal bars 26 affixed between the upper and middle bars 17 and 18 across the upper feeding area 23. Uniformly spaced vertical bars 27 (FIG. 1) are attached between the middle and lower bars 18 and 19 and traverse the lower feeding area 24.

The side or main feeder panels 13 are each comprised of upper 29, middle 30, and lower 31 horizontal members. The horizontal members 29, 30 and 31 are affixed between vertical end members 32; the horizontal members 29 and 31 being affixed to the top and bottom ends respectively of the end members 32. Three holes 33 (FIG. 4) are formed in and spaced along the length of the vertical members 32. The upper horizontal member 29 extends outwardly beyond the end members 32, terminating in depending portions 34. Again, the middle member 30 divides the side panel member 13 into upper and lower feeding sections indicated generally at 36 and 37 respectively. Diagonal bars 39 (FIG. 4) affixed between the upper and middle members 29 and 30, and vertical bars 40 (FIG. 1) affixed between the middle and lower members 30 and 31, partition the upper and lower feeding sections 36 and 37 respectively.

The upper member 29 of the side panel member 13 rests upon the upper member 17 of the frame panel 14 at 41 (FIG. 4). The side panel members 13 are thereby suspended across the frame panel members 14 and above the ground, the bottom member 31 never engaging the ground. The side panel members 13 are thereby readily slidable along the frame panel members 14.

Referring again to FIG. 4, the locking members or arms 15 each include a bar 42 having spaced holes 43 formed therein along its length, and a loop 44 attached at one end. The bar 42 is suspended by means of its loop 44 from the upper member 29 of the side panel member 13. When so suspended, the holes 33 and 43 are in alignment, and the bar 42 and end member 32 are connected by pins 46 inserted through the aligned holes 33 and 43. The pins 46 are held in place by conventional pins 47.

To assemble the invention 11, the side panel members 13 are laid upon and across the frame panel members 14, all in an upstanding manner as shown in FIG. 1. The locking members 15 are then held in a horizontally disposed position, and the loops 44 are then passed over the depending members 34. The locking members 15 are the allowed to freely depend from the side panel members 13 by the loops 44, or are additionally secured by any or all of the pins 46.

When used, the invention 11 is assembled around an already existing haystack 12, or it is partially disassembled by removal of one of the side panel members 13 and the fanning out of the frame panel members 14 to accomodate by attaching frame panel members 14 end-to-end.

Figure 2:
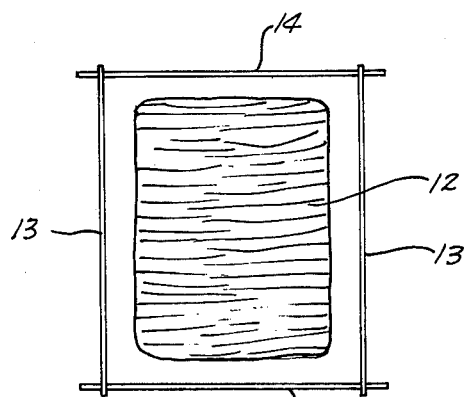
FIG. 2 is a top plan view of the invention enclosing a bread-loaf type of haystack.
Figure 3:
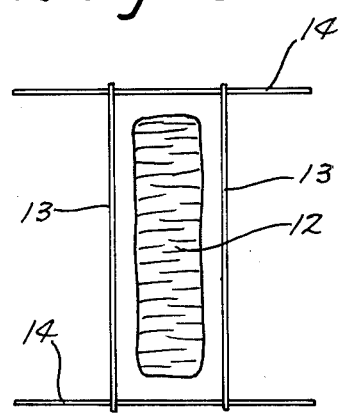
FIG. 3 is another top plan view showing the configuration of the invention after the haystack has been partially eaten away.

When the cattle are feeding, the adult animals will be reaching through upper feeding sections 23 and 36 thereby pressing against the diagonal bars 26 and 39; and the young animals will be reaching through the lower feeding areas 24 and 37, thereby pressing against the vertical bars 27 and 40 and horizontal bars 19 and 31. Most of the feeding will be done through the side panels 13 since the frame panels 14 do not slide and the haystack 12 is soon out of reach from those panels 14. As depicted in FIGS. 2 and 3, and as shown by the arrow in FIG. 4, the cattle push the side panels 13 inward toward the haystack 12 as it is consumed. The solid and hatched lines in FIG. 5 depict two positions of the side panel 13 and locking arm 15.

Figure 5:
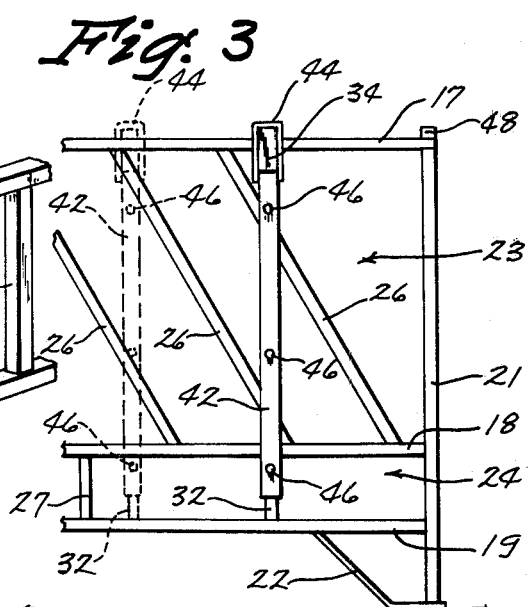
FIG. 5 is an enlarged, fragmentary, elevational view of the invention.

Referring to FIGS. 4 and 5, if completely free feeding is desired, all pins 46 are removed, allowing the cattle to push the side panels 13 inwardly toward the stack at will until the haystack 12 is consumed. If slightly limited feeding is desired, only the lower pins 46 are installed. The cattle will be able to slide the panel 13 until these pins 46 engage the bars 27 (FIGS. 1 and 4) which are spaced at greater intervals than that of the diagonal bars 26.

For still more controlled feeding, the lower pins 46 may be removed, but the upper two pins 46 are installed. The solid lines in FIG. 5 depict the engagement of the uppermost pins 46 with diagonal bars 26, with the result that the cattle can no longer slide the side panel 13. With the middle pins 46 installed, the cattle could pivot the lower part of the panel 13 about the upper pins 46 but the movement would be limited by the middle pins 46 engaging the next bar 26. It can readily be envisaged that several combinations of pin arrangements are available for limited feeding.

It will be noted that small safety blocks 48 are secured on the top surface at each end of each upper member 17 (FIGS. 4 and 5). These blocks 48 are large enough to prevent the slidable side panels 13 from sliding off either end of the frame panels 14, and thus act as safety members in that regard.

It can thus be seen from its operation that the invention 11 reduces both the difficulty of the farmer's labors and the time consumed thereon by eliminating the necessity of manually re-stacking the forage and substituting therefore a simple adjustment apparatus 11. The possibility of any part of the apparatus freezing or sticking in place have been removed by elevation of the movable side panels 13 above the ground. Also, the reduction of the haystack 12 by the cattle eating therefrom is accomplished in a controlled manner which results in little waste. Thus is can be seen that the objects of this invention are indeed achieved.

Although a preferred embodiment of this invention has been disclosed herein, it is to be remembered that various modifications and alternate constructions can be made thereto without departing from the full scope of the invention, as defined in the appended claims.

I claim:

1. A haystack feeder apparatus comprising:
   a plurality of upright first panels, a pair of said first panels arranged in parallel relation to each other, said parallel first panels having upper and lower horizontal members, interconnected by horizontally spaced braces;
   at least one upright second panel of a length to extend between said parallel first panels, said second panel having an upper member adapted to ride upon said first parallel panel upper members and with outer ends extended beyond said parallel first panels, said second panel movable along said parallel first panels in a direction parallel thereto;
   detachable means for limiting the horizontal movement of said second panel comprising an elongated locking bar suspended from each of said upper member outer ends, and at least one device fastenable to and extended between said locking bar and an adjacent end of said second panel, said device operable to engage one of said braces upon movement of said second panel a first distance along said parallel first panels.

2. A haystack feeder apparatus as defined in claim 1, and wherein each of said outer ends has a portion depending therefrom, and wherein said locking bar has a U-shaped loop at its upper end looped over said second panel upper member, the said upper end located horizontally higher than the lower end of said portion.

* * * * *